United States Patent [19]
Fuji et al.

[11] Patent Number: 5,724,319
[45] Date of Patent: Mar. 3, 1998

[54] MAGNETO-OPTICAL RECORDING APPARATUS HAVING TRANSIENT RESPONSE CORRECTION FOR MAGNETIC HEAD COIL CURRENTS

[75] Inventors: Hiroshi Fuji, Soraku-gun; Tomoyuki Miyake, Nara; Shigeo Terashima, Tenri, all of Japan

[73] Assignee: Sharp Kabushiki Kaisha, Osaka, Japan

[21] Appl. No.: 500,647

[22] Filed: Jul. 11, 1995

[30] Foreign Application Priority Data

Jul. 14, 1994 [JP] Japan ................................. 6-162333

[51] Int. Cl.⁶ ......................................................... G11B 7/00
[52] U.S. Cl. ................................................. 369/13; 369/124
[58] Field of Search ............................... 369/13, 59, 124; 360/46, 67, 55, 59, 60, 114, 6, 66, 48, 68

[56] References Cited

U.S. PATENT DOCUMENTS

| | | | |
|---|---|---|---|
| 5,327,297 | 7/1994 | Enami et al. | 360/46 |
| 5,329,408 | 7/1994 | Fuji | 360/46 X |
| 5,357,378 | 10/1994 | Urakawa | 360/46 |
| 5,359,466 | 10/1994 | Fujii et al. | 360/46 |

FOREIGN PATENT DOCUMENTS 1-130302  5/1989  Japan.

*Primary Examiner*—Muhammad N. Edun
*Attorney, Agent, or Firm*—Nixon & Vanderhye PC

[57] ABSTRACT

A magneto-optical recording device includes a magnetic field generating coil for generating a magnetic field on a magneto-optical recording medium, a power source for supplying a current to the magnetic field generating coil, switching circuit for driving said magnetic field generating coil to supply the current from the power source in the positive and negative directions by alternately forming first and second current paths according to recording information, first correcting circuit which is disposed on the first current path for correcting a transient response of the current amplitude in the positive direction caused by the magnetic field generating coil, and second correcting circuit which is provided on the second current path for correcting a transient response of the current amplitude in the negative direction caused by the magnetic field generating coil.

26 Claims, 10 Drawing Sheets

MAGNETO-OPTICAL RECORDING APPARATUS HAVING TRANSIENT RESPONSE CORRECTION FOR MAGNETIC HEAD COIL CURRENTS

FIELD OF THE INVENTION

The present invention relates to a magneto-optical recording device using a magnetic-field modulation method for recording information on a magneto-optical recording medium by modulating a magnetic field with an information signal.

BACKGROUND OF THE INVENTION

Figure 9:
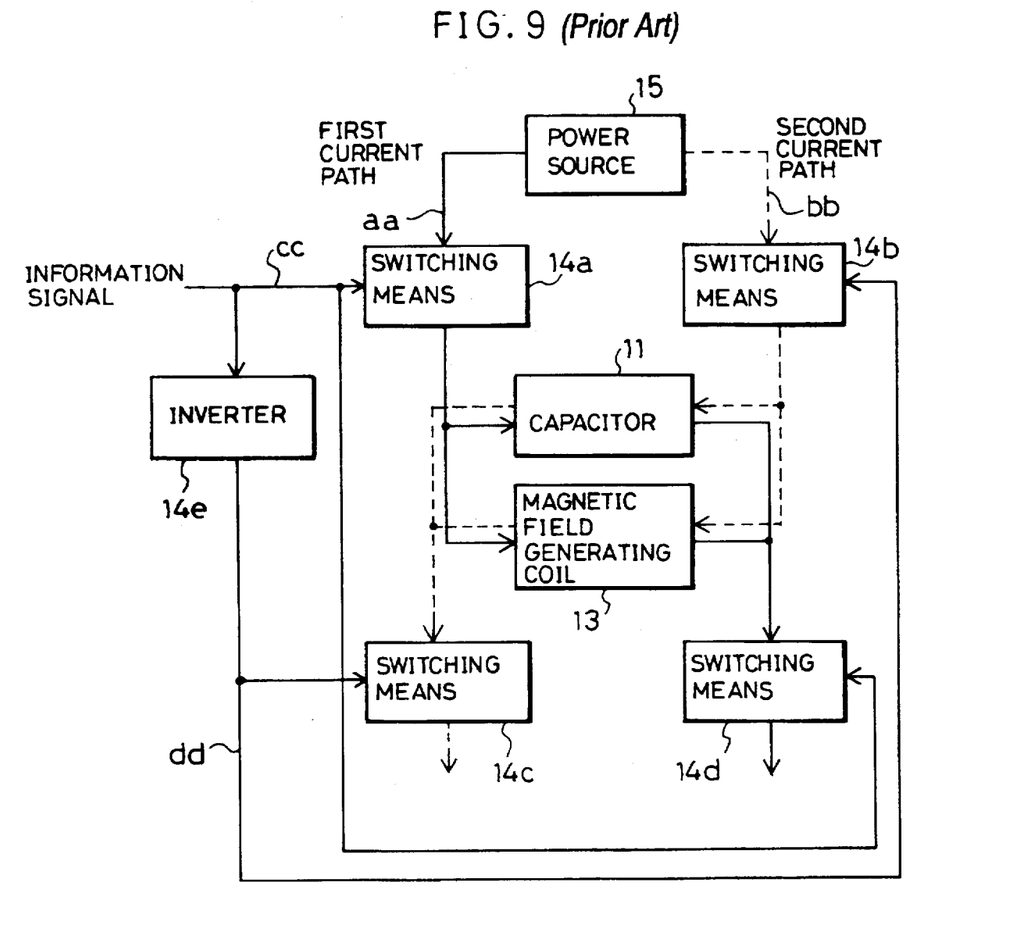
FIG. 9 is a block diagram showing a schematic structure of a conventional magneto-optical recording device.

A first conventional example of a recording device for generating a magnetic field on a magneto-optical recording medium is disclosed in Japanese Publication for Unexamined Patent Application No. 130302/1989 (Tokukaihei 1-130302). In this device, as illustrated in FIG. 9, an information signal cc is input to switching means 14a, 14d and an inverter 14e, and an inverted signal dd of the information signal cc is input to switching means 14c and 14b.

First, when the switching means 14a and 14d are turned on by the information signal cc, a current aa flows from a power source 15 along a first current path shown by the solid line. The current aa flows through the switching means 14a so as to drive a magnetic field generating coil 13 and a capacitor 11 which is arranged in parallel with the magnetic field generating coil 13, and flows to the switching means 14d.

On the other hand, when the switching means 14c and 14b are turned on, a current bb flows from the power source 15 along a second current path indicated by the broken line. The current bb flows through the switching means 14b so as to drive the magnetic field generating coil 13 and the capacitor 11 which is arranged in parallel with the magnetic field generating coil 13, and flows to the switching means 14c.

In the first conventional example, the magnetic field generating coil 13 and the capacitor 11 are arranged in parallel so that resonance is achieved and the currents aa and bb rise in a shorter time. Moreover, a direct current generated in the circuit is cut by arranging the magnetic field generating coil 13 and a capacitor, not shown, in series.

As for a second conventional example of a recording device for generating a magnetic field on a magneto-optical recording medium, U.S. Pat. No. 5,359,466 discloses a magnetic head driving circuit. In this magnetic head driving circuit, first switching means is turned between on and off in response to recording signals, thereby alternating a drive current to be applied from a direct-current source to a magnetic head coil. The direct-current source, a dummy load and an auxiliary coil are connected in series. Second switching means which is switched in connection with on/off of the first switching means is connected in parallel with the dummy load. In response to the switching of the first and second switching means, a magnetic head and the dummy load alternately function as a load of the auxiliary coil.

However, in the first conventional example, a problem arises that the amplitude of the current becomes smaller as the period of the inverting time of the current is decreased and as the inductance of the magnetic field generating coil 13 is increased by a transient response generated by the magnetic field generating coil 13.

Figure 10:
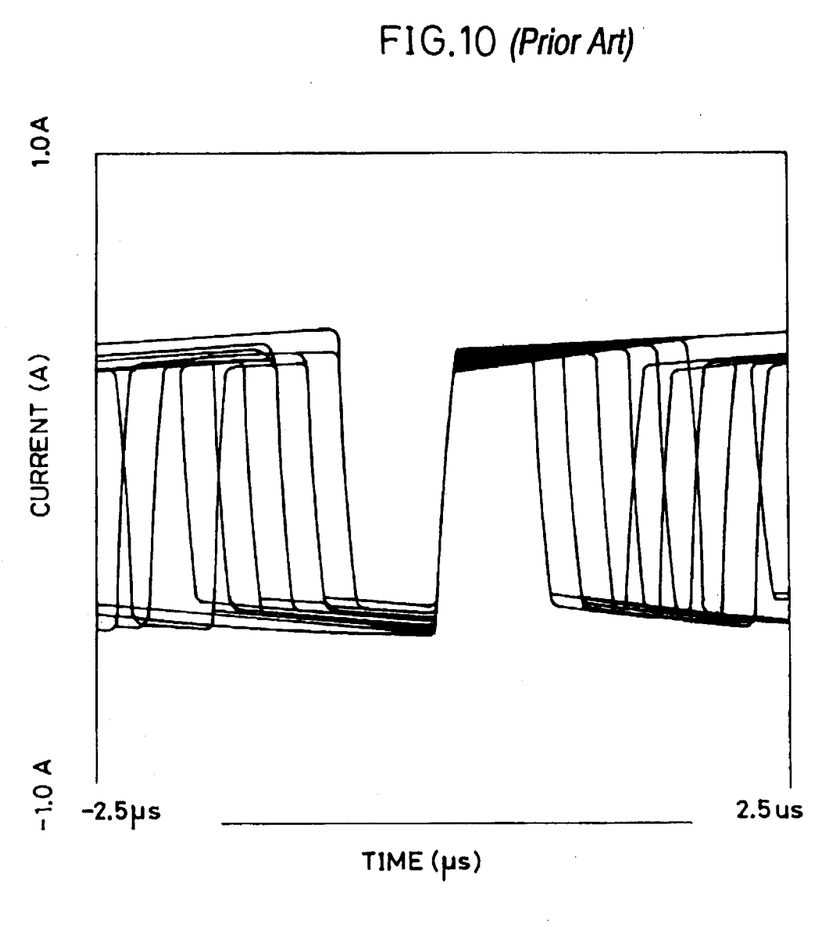
FIG. 10 is an explanatory view showing a waveform in the magneto-optical recording device shown in FIG. 9.
Figure 11:
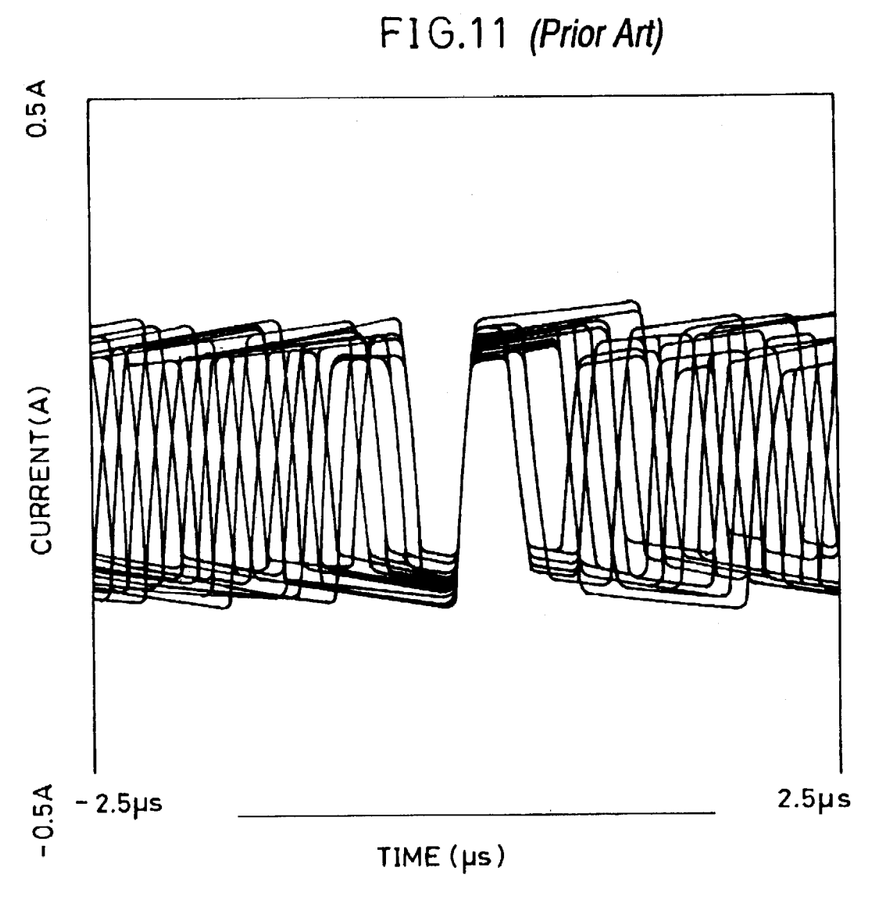
FIG. 11 is an explanatory view showing a waveform when data is transferred at a high speed by the magneto-optical recording device shown in FIG. 9.

FIGS. 10 and 11 are views showing the waveforms of actual driving currents of various data patterns in an EFM (Eight to Fourteen Modulation) superimposed on a digital oscilloscope.

In FIG. 10, the current rises in a shorter time due to resonance by the magnetic field generating coil 13 and the capacitor 11 shown in FIG. 9. However, the amplitude after the rise becomes smaller as the interval of inverting the current is shortened, resulting in unstable current amplitudes. FIG. 11 shows the waveform when the data transfer rate is doubled. In this case, since the interval of inverting the current is further shortened, the current amplitude is worsened to a level which is no longer suitable for recording data. Namely, when the data transfer rate is increased, the sizes of recording marks become unstable, causing a reproduction error.

Moreover, since the transient response is caused by the magnetic field generating coil, the current amplitude is worsened with an increase in the inductance. This creates a serious problem when enhancing the reliability of recorded data by increasing the inductance and the intensity of the generated magnetic field.

As a condition for generating a magnetic field, generally, it is necessary to use an amplitude of the maximum recording frequency at which a recording current amplitude becomes minimum among recording patterns as the minimum magnetic field required for recording. In the conventional examples, the amplitudes of current having frequencies other than the maximum recording frequency is increased due to a transient response. In this case, since a supply of excess current is required, the consumption of power in the entire circuit is increased.

Furthermore, heat generation of the magnetic field generating coil usually depends greatly on the root-mean-square value of a current. The amount of heat generation is reduced with a decrease of the root-mean-square value. It is thus possible to prevent a minute magnetic field generating coil which is weak in heat and a plastic substrate of a magneto-optical recording medium from being damaged by heat. In the conventional examples, the amplitudes of current having frequencies other than the maximum recording frequency are increased due to a transient response, and the amount of heat generation in the magnetic head is increased. Thus, the amount of heat generated in the magnetic head including the magnetic field generating coil is increased, and the heat tends to cause damage.

SUMMARY OF THE INVENTION

It is an objective of the present invention to provide a magneto-optical recording device capable of reducing a transient response caused by a magnetic field generating coil and of transferring data at high speeds.

It is another objective of the present invention to provide a magneto-optical recording device capable of reducing a transient response caused by a magnetic field generating coil and of enhancing the reliability of recorded data.

It is still another objective of the present invention to provide a magneto-optical recording device capable of reducing a transient response caused by a magnetic field generating coil, consumption of power, and the amount of heat generated by a magnetic head.

In order to achieve the above objectives, a first magneto-optical recording device according to the present invention is a magneto-optical recording device for recording information on a magneto-optical recording medium, and includes:

a magnetic field generating coil for generating a magnetic field whose direction is varied according to the direction of current in the vicinity of a magneto-optical recording medium;

a power source for supplying a current to the magnetic field generating coil so as to drive the magnetic field generating coil;

first and second current paths as routes through which the current flows in the positive and negative directions, respectively, to the magnetic field generating coil;

switching means for switching the direction of current flowing to the magnetic field generating coil between the positive and negative directions by alternately switching on and off the first and second current paths according to the recording information; and correcting means, disposed on the first and second current paths, for correcting a transient response of the current amplitude caused by the magnetic field generating coil.

In the structure of the first magneto-optical recording device, the correcting means corrects transient responses of the current amplitude in the positive and negative directions caused by the magnetic field generating coil.

Therefore, even when the inverting time of the current is shortened so as to increase the data transfer rate, the transient response is reduced and the current amplitude is maintained uniform. It is therefore possible to record recording marks of a uniform size, and transfer data at high speeds.

Moreover, even when the inductance of the magnetic field generating coil is increased, the transient response is reduced, thereby maintaining a uniform current amplitude. Since the inductance is increased, the magnetic field generating coil can generate an increased magnetic field, thereby allowing accurate recording of data. Namely, it is possible to improve the reliability of the recorded data.

In addition, since the transient response is reduced, if a condition for generating a magnetic field is satisfied, i.e., if the amplitude of the maximum recording frequency at which the recording current amplitude becomes minimum among recording patterns is used as the minimum magnetic field required for recording, the current amplitudes of all frequencies become equal. Consequently, a supply of current is efficiently performed, and the consumption of power in the entire circuit is decreased to a large degree.

Furthermore, since the transient response is reduced and since the current amplitudes of all frequencies become equal, it is possible to reduce the amount of heat generation in the magnetic head including the magnetic field generating coil.

A second magneto-optical recording device according to the present invention is based on the first magneto-optical recording device, wherein the correcting means includes:

first correcting means, disposed on the first current path, for correcting a transient response of the current amplitude in the positive direction caused by the magnetic field generating coil; and second correcting means, disposed on the second current path, for correcting a transient response of the current amplitude in the negative direction caused by the magnetic field generating coil.

In the structure of the second magneto-optical recording device, the first correcting means corrects a transient response of the current amplitude in the positive direction, and the second correcting means corrects a transient response of the current amplitude in the negative direction.

Therefore, even when the inverting time of the current is shortened so as to increase the data transfer rate, the transient response is reduced and the current amplitude is maintained uniform. In addition, even when the inductance of the magnetic field generating coil is increased, the transient response is reduced, and the current amplitude is maintained uniform. It is therefore possible to record recording marks of a uniform size, and transfer data at high speeds. Since the inductance is increased, the magnetic field generating coil can generate an increased magnetic field, thereby allowing accurate recording of data. Namely, it is possible to improve the reliability of the recorded data.

A third magneto-optical recording device according to the present invention is based on the second magneto-optical recording device, wherein the first current path allows only the flow of current in the positive direction to the first correcting means and does not allow the flow of current in the negative direction, and the second current path allows only the flow of current in the negative direction to the second correcting means and does not allow the flow of current in the positive direction.

In the structure of the third magneto-optical recording device, since resonance does not occur between the first and second correcting means and the magnetic field generating coil, it is possible to reduce the transient response without affecting the rise time of the current. In addition, it is possible to dispose the first and second correcting means independently of a conventional structure in which the current rises in a shorter time using resonance between the magnetic field generating coil and a resonant capacitor which is arranged in parallel with the magnetic field generating coil. It is thus possible to have the respective effects at the same time.

A fourth magneto-optical recording device according to the present invention is based on the second magneto-optical recording device, wherein the first correcting means and the second correcting means have the same frequency characteristics.

In the structure of the fourth magneto-optical recording device, since the first correcting means and the second correcting means are designed to have the same frequency characteristics, it is possible to simplify the circuit design.

A fifth magneto-optical recording device according to the present invention is based on the second magneto-optical recording device, wherein the first correcting means and the second correcting means are high-pass filters.

In the structure of the fifth magneto-optical recording device, since the first correcting means and the second correcting means are formed by simple high-pass filters, it is possible to simplify the circuit design.

A sixth magneto-optical recording device according to the present invention is based on the fifth magneto-optical recording device, wherein the high-pass filter includes at least one resistor and at least one capacitor connected in parallel.

In the structure of the sixth magneto-optical recording device, since each of the first correcting means and the second correcting means is constructed by the simplest high-pass filter formed by a resister and a capacitor, it is possible to further simplify the circuit structure.

A seventh magneto-optical recording device according to the present invention is based on the first magneto-optical recording device, wherein the first current path and the second current path include an overlapped section, and the correcting means is disposed in the overlapped section and corrects a transient response of the current amplitude in the positive and negative directions caused by the magnetic field generating coil.

In the structure of the seventh magneto-optical recording device, since one correcting means functions as both the first correcting means for correcting a transient response of the current amplitude in the positive direction and the second correcting means for correcting a transient response of the current amplitude in the negative direction, it is possible to simplify the circuit structure.

An eighth magneto-optical recording device according to the present invention is based on the seventh magneto-optical recording device, wherein the correcting means includes at least one resistor and at least one capacitor connected in parallel.

In the structure of the eighth magneto-optical recording device, since the correcting means is constructed by the simplest high-pass filter formed by a resister and a capacitor, it is possible to further simplify the circuit structure.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
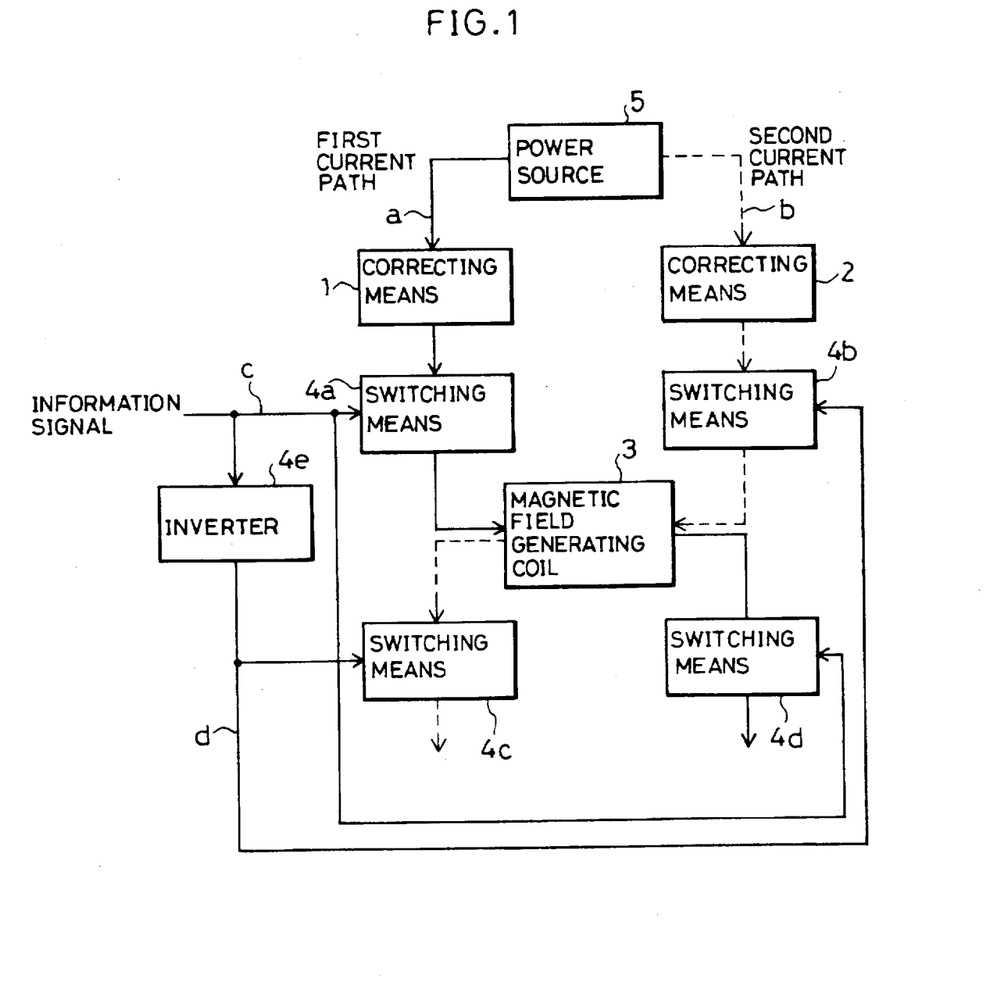
FIG. 1 is a block diagram showing a schematic structure of a magneto-optical recording device according to one embodiment of the present invention.

The following description discusses Embodiment 1 of the present invention with reference to FIGS. 1 to 4. As illustrated in FIG. 1, an information signal c is input to switching means 4a, 4d and an inverter 4e. An inverted signal d of the information signal c is input to switching means 4c and 4b. Switching means 4a, 4b, 4c, 4d and the inverter 4e form switching means for switching the driving current to flow through a magnetic field generating coil 3 in the positive direction (the rightward direction in FIG. 1) or in the negative direction (the leftward direction).

First, when the switching means 4a and 4d are turned on by the information signal c, a current a from a power source 5 flows along a first current path shown by the solid line. The current a passes through first correcting means 1 and the switching means 4a, flows through the magnetic field generating coil 3 in the positive direction, and then passes through the switching means 4d. The magnetic field generating coil 3 forms a magnetic head for performing magneto-optical recording. The correcting means 1 is disposed on the first current path, and corrects a transient response of the current amplitude in the positive direction caused by the magnetic field generating coil 3. At this time, since the switching means 4b and 4c are turned off by the inverter 4e, a second current path is shut off.

On the other hand, when the switching means 4c and 4b are turned on by the information signal c, a current b from the power source 5 flows along the second current path shown by the dot line. The current b passes through second correcting means 2 and the switching means 4b, flows through the magnetic field generating coil 3 in the negative direction, and passes through the switching means 4c. The correcting means 2 is disposed on the second current path, and corrects the transient response of the current amplitude in the negative direction caused by the magnetic field generating coil 3. At this time, since the switching means 4a and 4d are turned off, the first current path is shut off.

Figure 2:
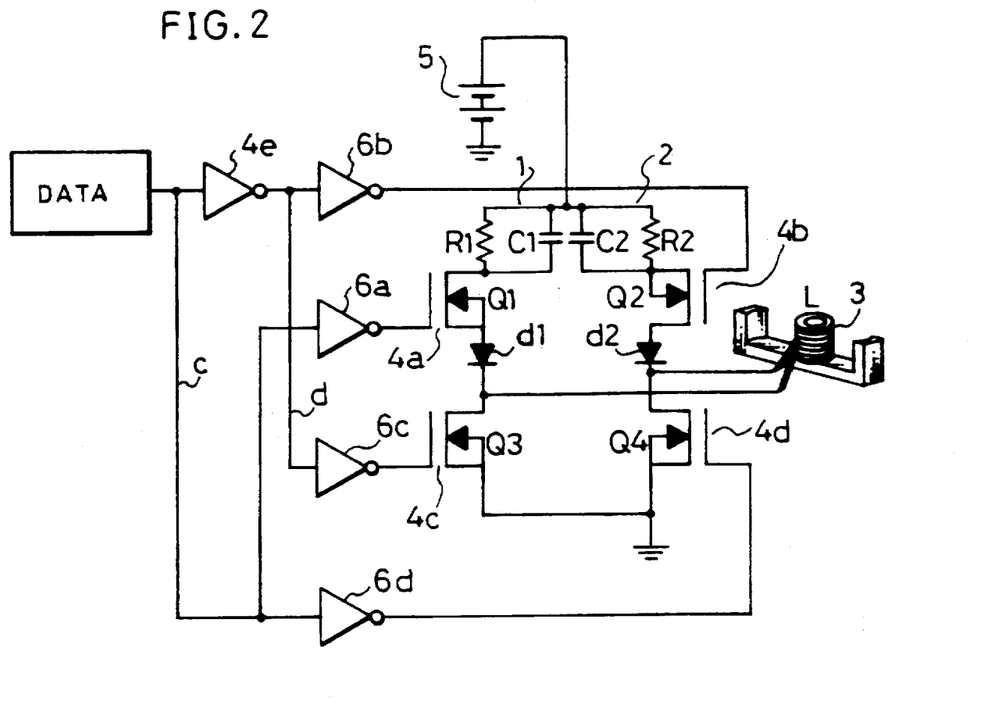
FIG. 2 is a circuit diagram showing a detailed structure of the magneto-optical recording device shown in FIG. 1.

FIG. 2 is a view for explaining FIG. 1 in detail, and illustrates a specific circuit. In this circuit, the information signal c is input to the switching means 4a through a driver 6a, to the switching means 4d through a driver 6d, and to the inverter 4e. The inverted signal d of the information signal c is input to the switching means 4b through a driver 6b, and to the switching means 4c through a driver 6c.

Switching means is formed by the switching means 4a, 4b, 4c, 4d, the drivers 6a, 6b, 6c, 6d, and the inverter 4e. The switching means switches the direction of the driving current between the positive direction and the negative direction. The switching means 4a, 4b, 4c, 4d are formed by FETs (Field Effect Transistors) Q1, Q2, Q3, Q4, respectively.

First, the switching means 4a (FET Q1) and the switching means 4d (FET Q4) are turned on by the information signal c. Then, the current flows in the positive direction along the first current path from the power source 5 through the first correcting means 1, the switching means 4a and a diode d1 to the magnetic field generating coil 3, and then to a ground through the switching means 4d. The first correcting means 1 is constructed by a resister R1 and a capacitor C1 connected in parallel, and disposed on the first current path. It is thus possible to correct the transient response of the current amplitude in the positive direction caused by the magnetic field generating coil 3.

At this time, since a transient response time $\tau_1$ is much longer than the current inverting time, the magnitude of the current amplitude becomes unstable in a conventional device. In order to prevent such a problem, it is desirable to set the time constant $\tau_{RC1}$ of a high-pass filter formed by the resister R1 and the capacitor C1 to a value close to the transient response time $\tau_1$. Thus, the time constant $\tau_{RC1}$ is Set longer than the current inverting time.

In order to completely eliminate the transient response, it is necessary to determine the values of the resister R1 and the capacitor C1 so that the time constant $\tau_{RC1}$ becomes equal to the transient response time $\tau_1$. However, this is limited only to the case where the transfer function of the overall circuit causing the transient response is equal to the inverse of the transfer function of the high-pass filter formed by the resister R1 and the capacitor C1. Actually, such an ideal case can hardly be achieved due to the a.c. characteristics of the magnetic field generating coil 3, and the PETs and diode connected in series. Therefore, it is only necessary to set the values so that the transient response is substantially eliminated.

At this time, the switching means 4b and 4c are turned off by the inverter 4e, and the second current path is shut off. Namely, a supply of current to the second correcting means 2 is cut off.

On the other hand, the switching means 4c (FET Q3) and the switching means 4b (FET Q2) are turned on by the inverted signal d of the information signal c. Then, the current from the power source 5 flows in the negative direction along the second current path to the magnetic field generating coil 3 through the second correcting means 2, the switching means 4b and a diode d2, and to the ground through the switching means 4c. The second correcting means 2 is constructed by a resister R2 and a capacitor C2 connected in parallel, and disposed on the second current path. It is therefore possible to correct a transient response of the current amplitude in the negative direction caused by the magnetic field generating coil 3.

Then, similarly to the above, it is desirable to set the time constant $\tau_{RC2}$ of a high-pass filter formed by the resister R2 and the capacitor C2 to a value close to the transient response time $\tau_1$.

At this time, the switching means 4a and 4d are turned off, and the first current path is shut off. Consequently, a supply of current to the first correcting means 1 is cut off.

If the transient response of the current a flowing through the magnetic field generating coil 3 in the positive direction (the rightward direction in FIG. 2) is equal to that of the current b flowing in the negative direction (the leftward direction in FIG. 2), it is necessary to arrange the resisters R1 and R2 to have the same value and the capacitors C1 and C2 to have the same value.

When the first correcting means 1 or the second correcting means 2 is connected in parallel or in series with the magnetic field generating coil 3, the first correcting means 1 or second correcting means 2 is located on both the first and second current paths. This arrangement is not preferred because an unwanted resonance occurs when inverting the current. The reason for this is that, unlike the first conventional example, resonance for shortening the rise time of the current is not achieved because the time constant is set to be equal to the transient response which is longer than the inverting time. Therefore, in order to prevent an unwanted resonance, it is preferable to dispose the first correcting means 1 on the first current path but not on the second current path so that the current flows in the positive direction and the current does not flow in the negative direction. Similarly, it is preferable to dispose the second correcting means 2 on the second current path but not on the first current path so that the current flows in the negative direction and the current does not flow in the positive direction.

In the circuit of the embodiment, it is possible to cut off the first and second correcting means 1 and 2 from the magnetic field generating circuit by the switching means 4a and 4b, respectively, so as to prevent resonance. This structure reduces only the transient response without causing resonance by the correcting means and the magnetic field generating circuit 3.

In the structure of the circuit, the first current path is perfectly switched between on and off by the information signal. Therefore, even if load switching means is disposed in the same position as the above to switch the load according to the information signal, one of the loads becomes meaningless and does not function as means for reducing the transient response. It is thus necessary to provide means having a transfer function for eliminating the transient response but not means for switching the load according to the information signal.

Figure 3:
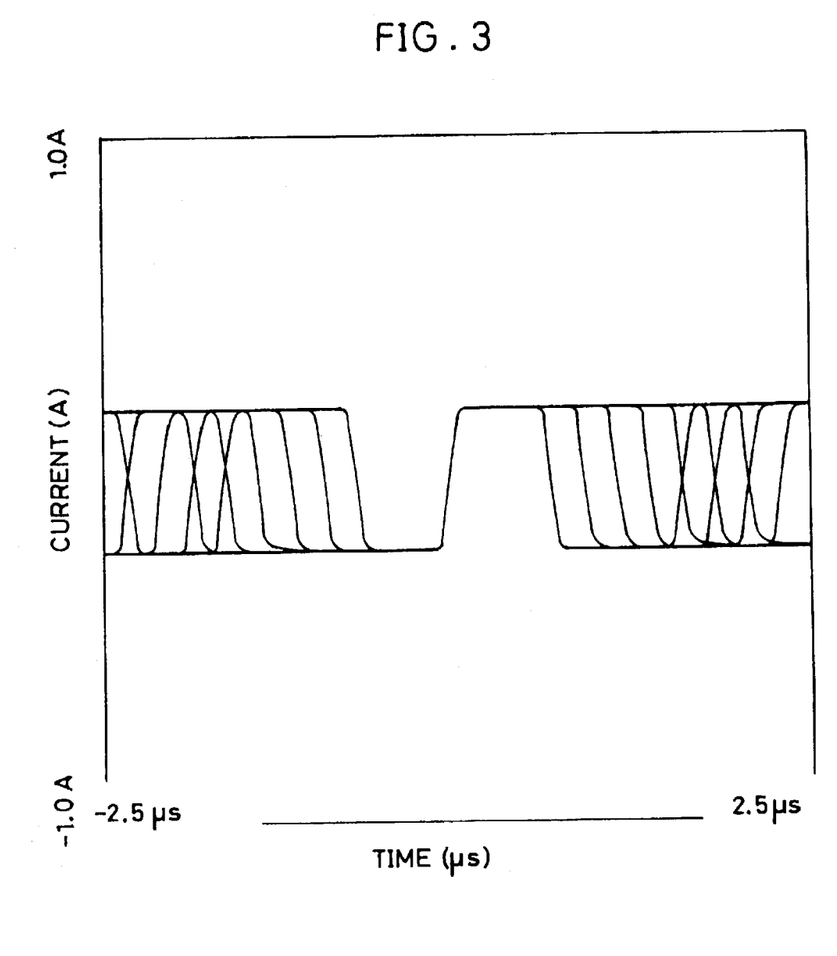
FIG. 3 is an explanatory view showing a waveform in the magneto-optical recording device shown in FIG. 1.
Figure 4:
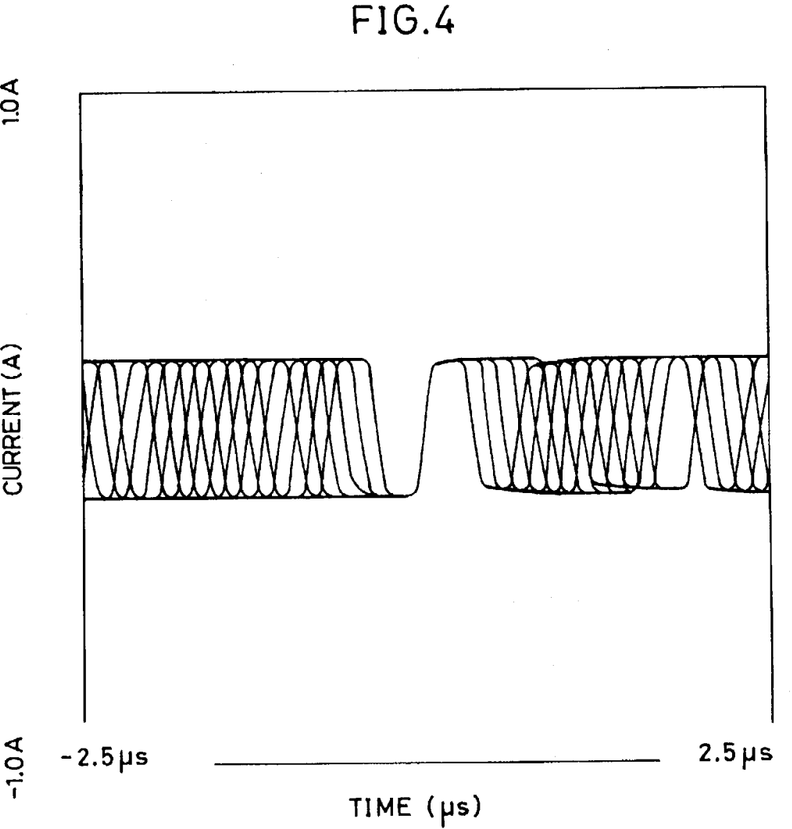
FIG. 4 is an explanatory view showing a waveform when data is transferred at a high speed by the magneto-optical recording device shown in FIG. 1.

FIG. 3 is a view showing the waveform of actual driving currents of various data patterns in EFM modulation superimposed on a digital oscilloscope. As shown in FIG. 3, the amplitude after the rise of current is much more stable compared to the conventional amplitude shown in FIG. 10. FIG. 4 shows a waveform obtained when the data transfer rate is doubled. Although the inverting interval is further shortened, the amplitude becomes extremely stable compared with the amplitude shown in conventional FIG. 11. It is thus possible to make the sizes of recording marks uniform, achieving a high data transfer rate.

The magnetic field generating coil 3 generates a magnetic field of an increased strength which is not lower than 100 (Oe) by increasing the inductance to a value larger than a conventional inductance. Therefore, even if the inductance is increased, the current amplitude is stabilized by simply changing constants such as a time constant of the correcting means in accordance with an increase in the inductance. Since the magnetic field is strengthened, it is possible to accurately record data.

In this embodiment, the following two effects are produced as well as the above-mentioned two effects. Namely, the third effect is a great reduction in the overall power consumption of the circuit. First, as for a condition of magnetic field generation, it is necessary to set the amplitude of a maximum recording frequency at which the amplitude of a recording current becomes smallest in the recording patterns as a minimum magnetic field required for recording. In order to compare the power consumption of the conventional waveform of FIG. 11 with the power consumption of the waveform of this embodiment shown in FIG. 4, the amplitudes at the maximum recording frequency are set equal to each other. As is clear from the conventional waveform in FIG. 11, the current amplitudes at frequencies other than the maximum recording frequency are increased due to a transient response, and an excess of current is supplied. Whereas it is known from the waveform of this embodiment shown in FIG. 4 that since the transient response is decreased, the current amplitudes at all of the frequencies become equal, thereby achieving an efficient supply of current.

For example, for comparison purposes, the high-inductance magnetic field generating coil 3, formed by 48 turns of wire having a diameter of 90 µm, for generating a strong magnetic field, is installed in a conventional recording device and in the recording device of this embodiment, respectively. In order to obtain an equal recording current amplitude (peak to peak current value) of 0.37 $A_{p-p}$ (to generate a magnetic field of 100 (Oe)), the conventional device consumed 0.73 W power, while the recording device of this embodiment consumed 0.49 W power. It is thus possible to reduce the power consumption by about 30 percent with the recording device of this embodiment.

The fourth effect is a great reduction in the heat generation in the magnetic field generating coil 3. The heat generation in a magnetic field generating coil depends largely on the effective value of the current. As the effective value becomes smaller, the generation of heat is reduced, preventing the minute magnetic field generating coil having a low resistance to heat and a plastic substrate of a magneto-optical recording medium from being damaged by heat. In the conventional waveform shown in FIG. 11 and the waveform of this embodiment shown in FIG. 4, similarly to the above, if the amplitudes at the maximum recording frequency are set equal to each other, the current amplitudes at frequencies other than the maximum recording frequency are increased in the conventional waveform of FIG. 11 due to a transient response, and an increased amount of heat generated. Whereas, in the waveform of this embodiment shown in FIG. 4, it is known that since the transient response is decreased, the current amplitudes at all of the frequencies become equal, thereby reducing the amount of heat generated.

For example, with the high-inductance magnetic field generating coil 3 (with a resistant temperature of 130° C.) for use in generating a strong magnetic field, when a recording current amplitude (0.44 $A_{p-p}$) is obtained, the temperature of a magnetic core becomes 185° C. and the temperature of a wound wire becomes 195° C. in the conventional device. These temperatures exceed the resistant temperature. Consequently, when recording is continuously performed for a long time, the magnetic field generating coil 3 is damaged and the plastic substrate of the magneto-optical recording medium is also damaged by heat. Whereas in this embodiment, since the temperatures of the magnetic core and the wound wire become 100° C. and 110° C., respectively, which are below the resistant temperature. Thus, even when continuous recording is performed for a long time, it is possible to prevent the magnetic field generating coil having weak resistance to heat from being damaged and the plastic substrate of the magneto-optical recording medium from being damaged by heat.

In a generally known magnetic disk device, i.e., hard disk device, the distance between a magnetic head and a recording medium is much smaller compared to that in a magneto-optical disk device. Therefore, very small inductance and driving current are used, and a small amount of power is consumed. On the other hand, the magneto-optical disk requires a strong magnetic field. The present invention produces great effects when applied to such a magneto-optical disk requiring a strong magnetic field. Especially, a significant effect is obtained when the present invention is applied to a device with a high transfer rate or to a device performing continuous recording for a long time.

In order to achieve the first correcting means 1 and the second correcting means 2 shown in FIG. 2 with the most simplified structures, a high-pass filter formed by a resister and a capacitor was used. However, in order to more accurately correct the transient response, the high-pass filter may be replaced by a filter which is constructed by considering the a.c. characteristics of an FET and a diode.

Furthermore, in addition to the structure of this embodiment, similarly to the conventional examples, it is possible to shorten the rise time of the current by arranging the magnetic field generating coil 3 and a capacitor in parallel. The reason for this is that since the correcting means 1 and 2 are shut off from the magnetic filed generating coil 3 by the switching means 4a and 4b, resonance is generated only by the capacitor which is connected in parallel with the magnetic field generating coil 3.

Figure 5:
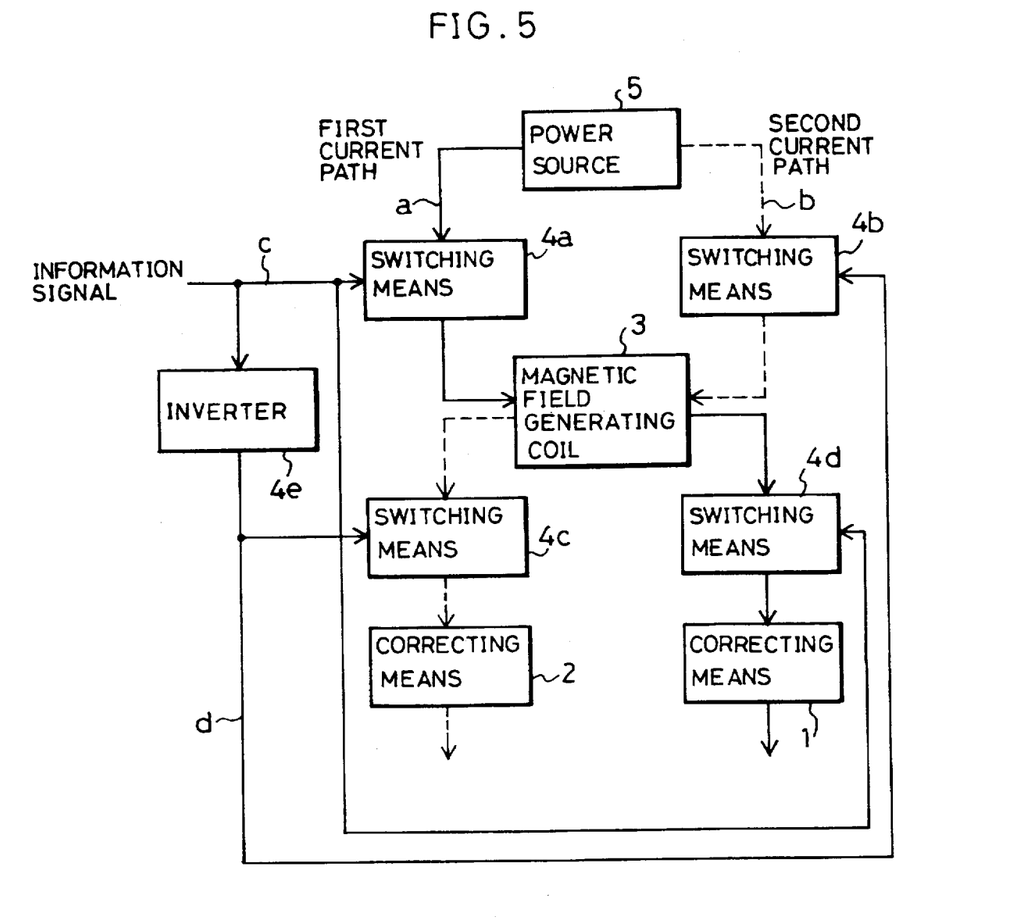
FIG. 5 is a block diagram showing a schematic structure of a magneto-optical recording device according to another embodiment of the present invention.

The following description discusses Embodiment 2 of the present invention with reference to FIG. 5.

As illustrated in FIG. 5, the information signal c is input to the switching means 4a, 4d and the inverter 4e. The inverted signal d of the information signal c is input to the switching means 4c and 4b. The switching means 4a, 4b, 4c, 4d and the inverter 4e form switching means for switching the direction of a driving current flowing through the magnetic field generating coil 3 to the positive direction (the rightward direction in FIG. 5) or the negative direction (the leftward direction).

First, when the switching means 4a and 4d are turned on by the information signal c, the current a flows from the power source 5 along the first current path shown by the solid line. The current a passes through the switching means 4a, flows through the magnetic field generating coil 3 in the positive direction, and then flows to the switching means 4d and the first correcting means 1. The correcting means 1 is disposed on the first current path, and corrects the transient response of the current amplitude in the positive direction caused by the magnetic field generating coil 3. At this time, since the switching means 4b and 4c are turned off by the inverter 4e, the second current path is shut off.

On the other hand, when the switching means 4c and 4b are turned on by the inverted signal d of the information signal c, the current b flows from the power source 5 along the second current path shown by the dot line. The current b passes through the switching means 4b, flows through the magnetic field generating coil 3 in the negative direction, and then flows to the switching means 4c and the second correcting means 2. The correcting means 2 is disposed on the second current path, and corrects the transient response of the current amplitude in the negative direction caused by the magnetic field generating coil 3. At this time, since the switching means 4a and 4d are turned off, the first current path is shut off.

Other structures of this embodiment are similar to those of Embodiment 1, and therefore a detailed explanation will be omitted. The structures of this embodiment produce the same effects as Embodiment 1.

Figure 6:
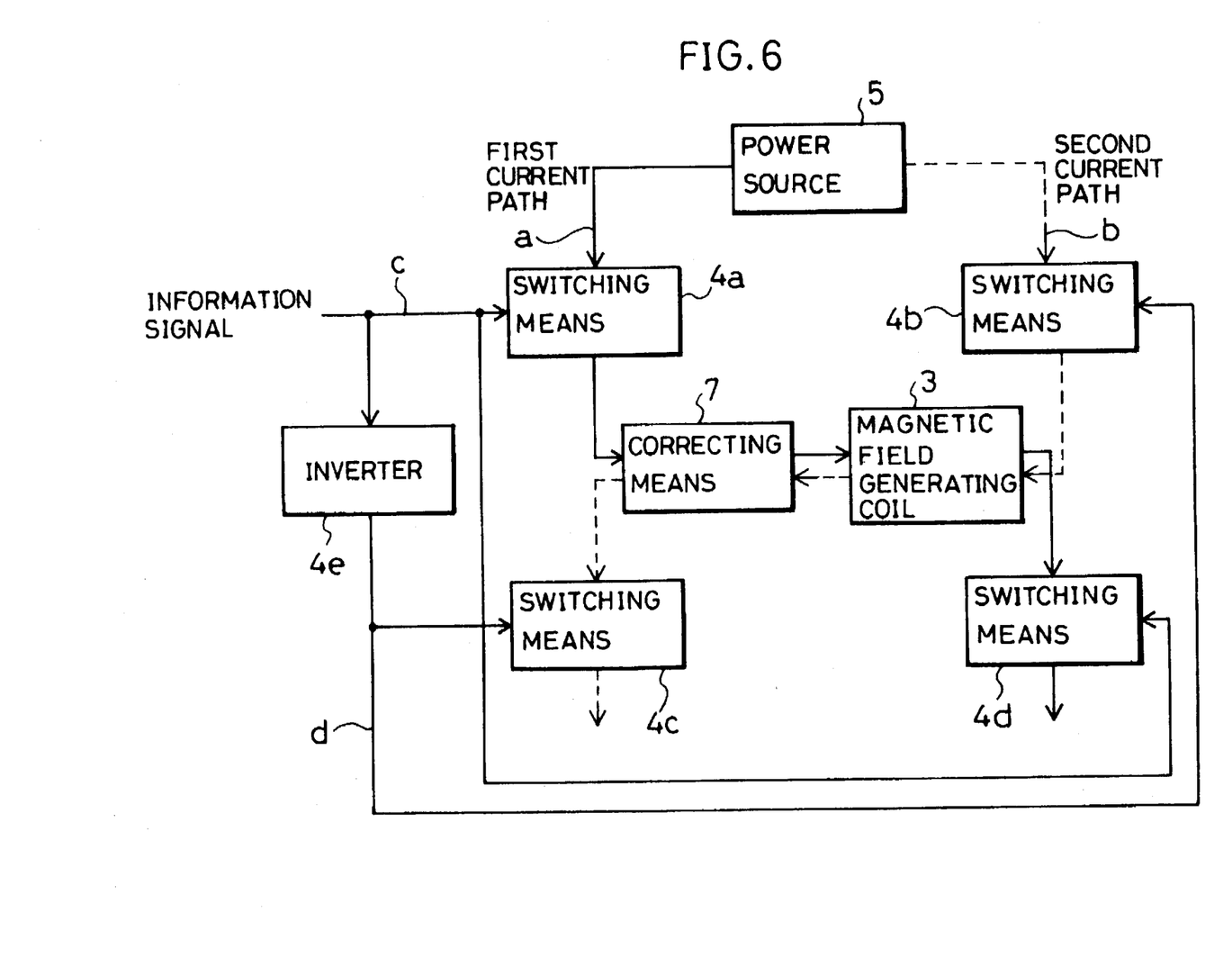
FIG. 6 is a block diagram showing a schematic structure of a magneto-optical recording device according to still another embodiment of the present invention.
Figure 7:
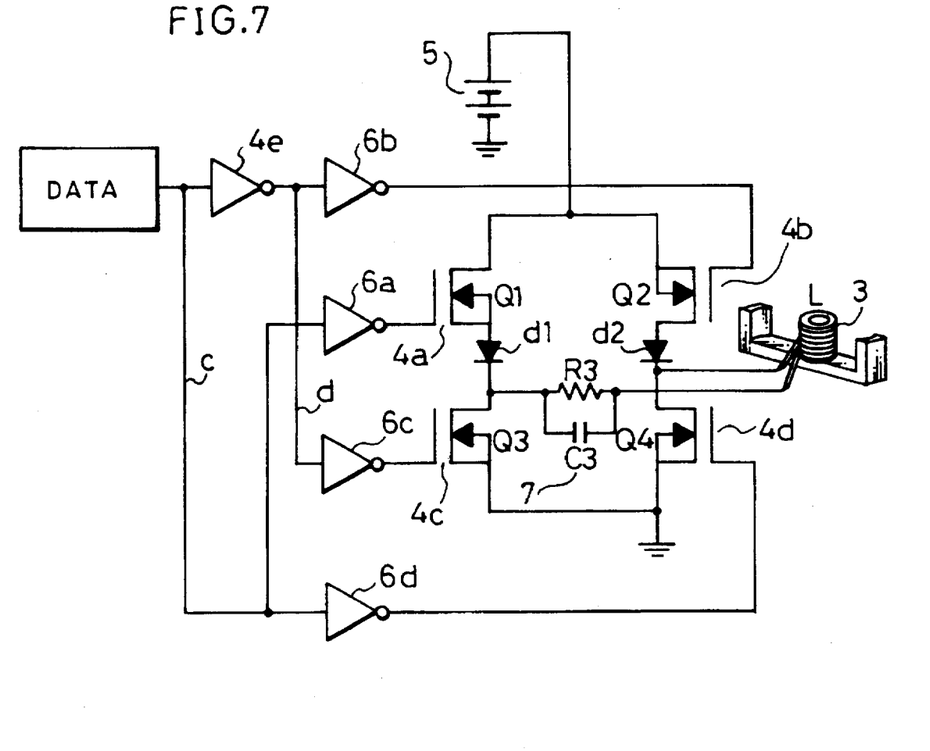
FIG. 7 is a circuit diagram showing a detailed structure of the magneto-optical recording device shown in FIG. 6.

The following description discusses Embodiment 3 of the present invention with reference to FIGS. 6 and 7.

As illustrated in FIG. 7, the information signal c is input to the switching means 4a, 4d and the inverter 4e. The inverted signal d of the information signal c is input to the switching means 4c and 4b. The switching means 4a, 4b, 4c, 4d and the inverter 4e form switching means for switching the direction of a driving current flowing through the magnetic field generating coil 3 between the positive direction (the rightward direction in FIG. 7) and the negative direction (the leftward direction).

First, when the switching means 4a and 4d are turned on by the information signal c, the current a flows from the power source 5 along the first current path shown by the solid line. The current a passes through the switching means 4a and correcting means 7, and flows through the magnetic field generating coil 3 in the positive direction to the switching means 4d. At this time, since the switching means 4b and 4c are turned off by the inverter 4e, the second current path is shut off.

On the other hand, when the switching means 4c and 4b are turned on by the information signal c, the current b flows from the power source 5 along the second current path shown by the dot line. The current b passes through the switching means 4b, flows through the magnetic field generating coil 3 in the negative direction, and then flows to the correcting means 7 and the switching means 4c. At this time, since the switching means 4a and 4d are turned off, the first current path is shut off.

The correcting means 7 is disposed in an overlapped section of the first and second current paths, and corrects transient responses of the current amplitude in the positive and negative directions caused by the magnetic field generating coil 3.

FIG. 7 is provided for explaining FIG. 6 in detail, and illustrates a specific circuit. In this circuit, the information signal c is input to the switching means 4a through the driver 6a, to the switching means 4d through the driver 6d, and to the inverter 4e. The inverted signal d of the information signal c is input to the switching means 4b through the driver 6b, and to the switching means 4c through the driver 6c.

Switching means is formed by the switching means 4a, 4b, 4c, 4d, the drivers 6a, 6b, 6c, 6d, and the inverter 4e. The switching means switches the direction of a driving current between the positive and negative directions. FETs Q1, Q2, Q3, Q4 are used as the switching means 4a, 4b, 4c, 4d, respectively.

First, the switching means 4a (FET Q1) and the switching means 4d (FET Q4) are turned on by the information signal c. Then, the current from the power source 5 flows in the positive direction along the first current path to the magnetic field generating coil 3 through the switching means 4a, the diode d1 and the correcting means 7, and to the ground through the switching means 4d.

At this time, since the switching means 4b and 4c are turned off by the inverter 4e, the second current path is shut off.

On the other hand, when the switching means 4c (FET Q3) and the switching means 4b (FET Q2) are turned on by the inverted signal d of the information signal c, the current from the power source 5 flows in the negative direction along the second current path to the magnetic field generating coil 3 through the switching means 4b and the diode d2, and to the ground through the correcting means 7 and the switching means 4c.

At this time, the switching means 4a and 4d are turned off, and the first current path is shut off.

In the first conventional example, in order to eliminate a direct current component generated by the circuit structure, only a capacitor (not shown) is connected in series with the magnetic field generating coil. By contrast, in this embodiment, a resister R3 is connected in parallel with a similar capacitor C3. This arrangement allows the passage of low frequency current within limits, thereby reducing the transient response.

Since the correcting means 7 is formed by connecting the resister R3 and the capacitor C3 in parallel, it is possible to correct the transient responses of the current amplitude in the positive and negative directions caused by the magnetic field generating coil 3.

Similarly to Embodiment 1, it is desirable to set the time constant $\tau_{RC3}$ of a filter formed by the resister R3 and the capacitor C3 to a value close to the transient response time $\tau_1$. Hence, the time constant $\tau_{RC3}$ is set longer than the current inverting time. Consequently, it is possible to solve the problem associated with the first conventional example by minimizing the effect on resonance less than the current inverting time.

Moreover, in this embodiment, the correcting means 7 is adjacent to the magnetic field generating coil 3, and the correcting means 7 is located on both the first and second current paths. This arrangement is not preferred because an unwanted resonance may be generated when inverting the current. It is thus difficult to reduce the transient response independently of resonance. Furthermore, this embodiment is limited to the case in which the transient response of the current a flowing through the magnetic field generating coil 3 in the positive direction (the rightward direction in FIG. 7) and the transient response of the current b flowing in the negative direction (the leftward direction in FIG. 7) are equal to each other. It is therefore difficult to eliminate differences in the current amplitude caused by variations in diodes and FETs and differences in the transient response between the positive and negative directions.

However, although the effect of minimizing the transient response is smaller than those of Embodiments 1 and 2, the circuit structure can be simplified by replacing the correcting means 1 and 2 in Embodiments 1 and 2 with one correcting means 7 which is formed by one resister and one capacitor.

Other structures of this embodiment are similar to those of Embodiment 1, and therefore a detailed explanation will be omitted.

Figure 8:
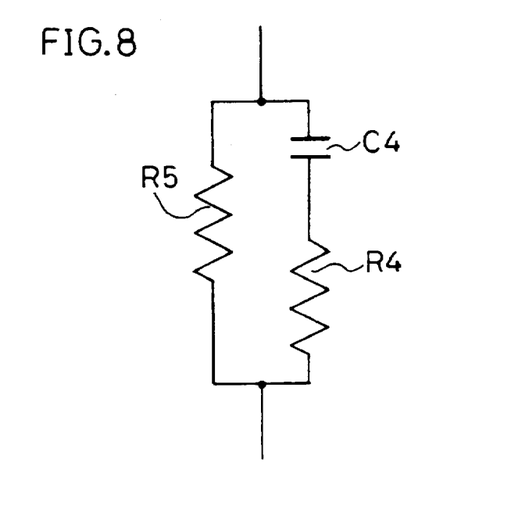
FIG. 8 is a circuit diagram showing the structure of correcting means used in a magneto-optical recording device according to still another embodiment of the present invention.

The following description discusses Embodiment 4 of the present invention with reference to FIG. 8. The members having the same function as in the above-mentioned embodiments will be designated by the same code and their description will be omitted.

As illustrated in FIG. 8, each of the correcting means 1, 2 and 7 is formed by resisters R4, R5, and a capacitor C4. Namely, the resister R4 which is connected in series with the capacitor C4 is added to the structures of the correcting means 1, 2 and 7 of Embodiments 1 to 3.

It is therefore possible to adjust the current amplitude by the resister R4 in addition to the correction of the transient responses of the current amplitude in the positive and negative directions caused by the magnetic field generating coil 3.

Other structures of this embodiment are similar to those of Embodiment 1, and therefore a detailed explanation will be omitted.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording device for recording information on a magneto-optical recording medium, comprising:

a magnetic field generating coil for generating a magnetic field whose direction is varied according to a direction of a current in the vicinity of said magneto-optical recording medium;

a power source for supplying a current to said magnetic field generating coil so as to drive said magnetic field generating coil;

first and second current paths as routes through which the current from said power source flows in positive and negative directions with respect to said magnetic field generating coil;

switching means for switching the direction of the current flowing to said magnetic field generating coil between the positive and negative directions by alternatively switching on and off said first and second current paths according to the information; and correcting means, disposed on said first and second current paths in series with said switching means, for correcting a transient response caused by current flowing through said magnetic field generating coil.

2. The magneto-optical recording device according to claim 1, wherein said correcting means includes:

first correcting means, disposed in said first current path after said power source and prior to said switching means which immediately precedes said magnetic field generating coil, for correcting a transient response in said first current path caused by said magnetic field generating means; and second correcting means, disposed in said second current path after said power source and prior to said switching means which immediately precedes said magnetic field generating coil, for correcting a transient response in said second current path caused by said magnetic field generating means.

3. The magneto-optical recording device according to claim 2, wherein said first current path allows the flow of current in the positive direction but does not allow the flow of current in the negative direction, and said second current path allows the flow of current in the negative direction but does not allow the flow of current in the positive direction.

4. The magneto-optical recording device according to claim 2, wherein said switching means includes:

first switching means for switching on and off said first current path; and second switching means for switching on and off said second current path, wherein said first correcting means is connected to said magnetic field generating coil through said first switching means, and said second correcting means is connected to said magnetic field generating coil through said second switching means.

5. The magneto-optical recording device according to claim 2, wherein said first and second correcting means have the same frequency characteristics.

6. The magneto-optical recording device according to claim 2, wherein said first correcting means and second correcting means are high-pass filters.

7. The magneto-optical recording device according to claim 6, wherein a time constant of each of said high-pass filters is larger than an inverting time of the current.

8. The magneto-optical recording device according to claim 6, wherein each of said high-pass filters includes at least one resister and at least one capacitor connected in parallel.

9. The magneto-optical recording device according to claim 8, wherein an impedance of a high-pass filter of said first correcting means is equal to an impedance of a high-pass filter of said second correcting means.

10. The magneto-optical recording device according to claim 8, wherein each of said high-pass filters includes at least one resister connected in series with said capacitor.

11. The magneto-optical recording device according to claim 1, wherein said first and second current paths include an overlapped section, and said correcting means is disposed in said overlapped section and corrects transient responses of the current amplitude in the positive and negative directions caused by said magnetic field generating means.

12. The magneto-optical recording device according to claim 11, wherein said correcting means is a high-pass filter.

13. The magneto-optical recording device according to claim 12, wherein a time constant of said high-pass filter is larger than an inverting time of the current.

14. The magneto-optical recording device according to claim 12, wherein said high-pass filter includes at least one resister and at least one capacitor connected in parallel.

15. The magneto-optical recording device according to claim 12, wherein said high-pass filter includes at least one resister connected in series with said capacitor.

16. The magneto-optical recording device according to claim 1, wherein said correcting means comprises:

first correcting means, disposed in said first current path after said switching means which immediately follows said magnetic field generating coil, for correcting a transient response in said first current path caused by said magnetic field generating means; and second correcting means, disposed in said second current path after said switching means which immediately follows said magnetic field generating coil, for correcting a transient response in said second current path caused by said magnetic field generating means.

17. A magneto-optical recording device, comprising:

a magnetic field generating coil for recording information on a magneto-optical recording medium;

a power source for supplying a current to said magnetic field generating coil;

first and second switchable current paths through which current is directed to flow from said power source through said magnetic field generating coil respectively in a first direction and in a second direction opposite said first direction;

a plurality of electrical current switching elements connected in said first and second current paths, said electrical current switching elements responsive to an information signal to change a direction of current flowing through said magnetic field generating coil between said first and second directions by directing current from said power source alternatively between said first and second current paths according to said information signal; and a transient response correction element connected in series with an electrical current switching element in at least one of said first and second current paths, said correction element correcting a transient response of said magnetic field generating coil due to changes in current direction through said magnetic field generating coil.

18. A magneto-optical recording device as set forth in claim 17, wherein said switching elements are FET transistors.

19. A magneto-optical recording device as set forth in claim 17, wherein said transient response correction element comprises parallel connected resistance and capacitance elements.

20. A magneto-optical recording device as set forth in claim 19, wherein said parallel connected resistance and capacitance elements have an electrical time constant that is substantially equivalent to a transient response time of said magnetic field generating coil.

21. A magneto-optical recording device as set forth in claim 17, wherein a transient response correction element is disposed between said power source and a current switching element in at least one of said first and second current paths.

22. A magneto-optical recording device as set forth in claim 17, wherein a transient response correction element is disposed after said magnetic field generating coil between a current switching element and a circuit ground in at least one of said first and second current paths.

23. A magneto-optical recording device as set forth in claim 17, wherein a single transient response correction element is connected directly in series with said magnetic field generating coil so as to be common to both said first and second current paths.

24. In a magneto-optical recording apparatus used for recording an information signal, an arrangement for correcting the transient response of a recording head coil, comprising:

a plurality of electrical current switching elements connected in first and second independent current paths through said recording head coil, each current path conducting current through said recording head in opposite directions, said electrical current switching elements responsive to said information signal to change a direction of current flowing through said recording head coil by directing current alternatively between said first and second current paths; and a transient response correction circuit connected in series with an electrical current switching element in at least one of said first and second current paths, said correction circuit correcting a transient response of said magnetic field generating coil due to changes in current direction through said magnetic field generating coil.

25. In a magneto-optical recording apparatus having a plurality of electrical current switching elements connected in first and second current paths through a recording head coil, each current path conducting current through said recording head in opposite directions, said electrical current switching elements responsive to an information signal to change a direction of current flowing through said recording head coil by directing current alternatively between said first and second current paths, a method for correcting a transient response of a recording head coil, comprising the step of:

connecting a transient response correction circuit in series with said recording head coil whenever said switching elements are operated to direct current alternatively between said first and second current paths.

26. The method for correcting a transient response of a recording head coil set forth in claim 25, wherein the transient response correction circuit comprises parallel connected resistance and capacitance elements having an electrical time constant that is substantially equivalent to a transient response time of said magnetic field generating coil.

* * * * *